United States Patent [19]
Akkapeddi et al.

[11] Patent Number: 4,847,322
[45] Date of Patent: Jul. 11, 1989

[54] THERMOPLASTIC COMPOSITIONS CONTAINING ACYLLACTAM GRAFT LINKAGES

[75] Inventors: Murali K. Akkapeddi, Morris Plains; John C. Haylock, Parsippany; Jay A. Gervasi, Succasunna, all of N.J.

[73] Assignee: Allied-Signal Inc., Morris Township, Morris County, N.J.

[21] Appl. No.: 111,469

[22] Filed: Oct. 22, 1987

[51] Int. Cl.$^4$ ............... C08L 67/00; C08L 77/00
[52] U.S. Cl. ..................... 525/10; 525/184; 525/283; 525/426; 525/445
[58] Field of Search ............ 525/184, 10, 445, 283, 525/426

[56] References Cited
U.S. PATENT DOCUMENTS

| | | | |
|---|---|---|---|
| 3,388,186 | 6/1968 | Kray et al. | 525/69 |
| 3,668,274 | 6/1972 | Owens et al. | 525/66 |
| 3,845,163 | 10/1974 | Murch | 525/183 |
| 4,174,358 | 11/1979 | Epstein | 525/183 |
| 4,590,242 | 5/1986 | Horn et al. | 525/184 |
| 4,598,125 | 7/1986 | Horn et al. | 525/184 |

FOREIGN PATENT DOCUMENTS 0213723 12/1984 Japan ................... 525/184

Primary Examiner—John C. Bleutge
Assistant Examiner—A. Carrillo
Attorney, Agent, or Firm—Melanie L. Brown; Roger H. Criss

[57] ABSTRACT

The present invention is directed to a reaction product of a polymer and a graft linking agent, resulting in a modified polymer especially suited for blending with one or more second thermoplastic polymers.

The modified polymers of the invention comprise a reaction product of the polymer and an acyllactam having the general formula:

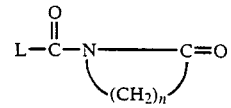

wherein L is a linking moiety that is capable of a thermal or radical-initiated addition reaction with said polymer; and preferably

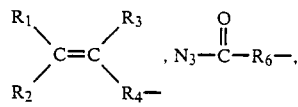

or $N_3SO_2-R_6-$ wherein $R_1$, $R_2$ and $R_3$ are the same or different and comprise at least one of the following moieties: Hydrogen, alkyl, aryl, halo, cyano, carboxylic acid, ester, amide, imide, or acyllactam, and wherein $R_4$ is — (valence bond) or

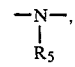

with $R_5$ being hydrogen, alkyl, or aryl, and $R_6$ being alkylene or arylene; and wherein the acyllactam portion of the grafting agent has an alkyl chain length, n, of about 2 to 11 carbon atoms, preferably about 3 to 11 carbon atoms, most preferably about 5 to 11 carbon atoms.

The reaction product of the first polymer and grafting agent itself is useful as a structural resin, and does not have to be blended with a second polymer. However, it also demonstrates adhesive properties useful in laminations to other polymers, coextrusions with other polymers, metal bonding, and the like, and could be used in applications such as these. The reaction product is a stable product that may be stored for further use. Alternatively, it may be desirable for some applications to blend all the components, a first polymer, grafting agent, and a second thermoplastic polymer, either together or sequentially.

17 Claims, No Drawings

THERMOPLASTIC COMPOSITIONS CONTAINING ACYLLACTAM GRAFT LINKAGES

BACKGROUND OF THE INVENTION

It is generally known from ABS and styrenic technology that the toughness of a rigid thermoplastic can be improved by the incorporation of a low modulus, elastomeric polymer dispersion (C. B. Bucknall, "Toughened Plastics", Applied Science Publishers Ltd., London, 1977). When uniformly dispersed, the rubber particles act as effective sites for stress concentration or stress transfer, and significantly improve the impact energy absorbing characteristics of the matrix through a crazing and shear yielding mechanism. It is also recognized that size of the rubber particles and the degree of adhesion or grafting to the matrix is also important.

Many thermoplastic polymers such as polyesters and polyamides are intrinsically ductile materials but are quite notch sensitive i.e., brittle when sharply notched. Improvement of notched Izod of polyamides has been described in the art, for example, U.S. Pat. No. 3,845,163 describes the use of acid-containing polyolefins and U.S. Pat. NO. 3,668,274 describes the use of core-shell elastomers, for this purpose. However, significant improvements in notched Izod of polyamides were achieved only through graft linking of the impact modifier through the teachings of Kray, U.S. Pat. No. 3,388,186 (1968) and Epstein, U.S. Pat. No. 4,174,358 (1979). Kray describes graft copolymerization techniques while Epstein uses maleic anhydride modified rubbers, where the anhydride moiety provides and adhering sites for nylon. The rubbers claimed by Epstein have the general formula $$(A)_a-(B)_b-(C)_c-(D)_d-(E)_e-(F)_f-(G)_g-(H)_h$$

where the critical site for "graft linking" or "adhering to" nylon is either C, an $\alpha, \beta$ unsaturated anhydride or derivatives thereof, or D, an epoxide.

SUMMARY OF THE INVENTION

The present invention is directed to a reaction product of a polymer and a graft linking agent, resulting in a modified polymer especially suited for blending with one or more second thermoplastic polymers.

The modified polymers of the invention comprise a reaction product of the polymer and an acyllactam having the general formula:

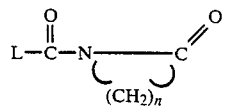

wherein L is a linking moiety that is capable of a thermal or radical-initiated addition reaction with said polymer; and preferably

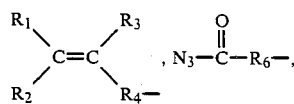

or $N_3SO_2-R_6-$ wherein $R_1$, $R_2$ and $R_3$ are the same or different and comprise at least one of the following moieties: Hydrogen, alkyl, aryl, halo, cyano, carboxylic acid, ester, amide, imide, or acyllactam, and wherein $R_4$ is—(valence) bond or

with $R_5$ being hydrogen, alkyl, or aryl, and $R_6$ being alkylene or arylene; and wherein the acyllactam portion of the grafting agent has an alkyl chain length, n, of about 2 to 11 carbon atoms, preferably about 3 to 11 carbon atoms, most preferably about 5 to 11 carbon atoms. It is preferred that L be

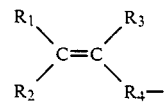

wherein $R_1$, $R_2$ and $R_3$ are the same or different and are at least one moiety selected from the group consisting of H, alkyl of about ($C_1$ to $C_4$), phenyl, and acyllactam, and $R_4$ is—(valence bond).

DETAILED DESCRIPTION OF THE INVENTION

The reaction product of the invention comprises a polymer and a graft linking agent which has reacted at least to some extent with the polymer by way of a thermal or radical initiated addition reaction through the linking moiety L, or by a nucleophilic reaction with the acyllactam portion of the molecule. The thus-modified polymer is particularly suitable for blending with otherwise incompatible second thermoplastic polymers. Rubbery high molecular weight materials are particularly suited to be reacted with the graft linking agents of the invention by way of the thermal or radical-initiated addition reaction. The modified rubbery materials are then especially suited to be blended with a second thermoplastic component, especially a polyamide or combination of second components.

It should be appreciated, however, that the polymers suitable for modifications with the grafting agents of the invention vary widely, limited only in that they react with the graft-linking agents, at least to some extent, by way of a thermal of radical-initiated addition reaction, or by way of a nucleophilic reaction. In this regard then, one of skill in the art should appreciate that the polymer component of the reaction product of the invention may be a rubbery high molecular weight material, polyamide, polyester, or a functionalized polyolefin, to name but a few.

However, in the preferred embodiments of the invention, the reaction product comprises the graft linking agent attached to a polymer backbone. The polymer backbones of the invention are characterized in that they have functional moieties providing sites for modification along their backbone by the generation of free radicals. The backbone polymers of the invention are generally rubbery high molecular weight materials. The rubbery polymer is defined as having an ASTM D-638 tensile modulus of less than about 40,000, typically less than 25,000, and preferably less than 20,000. It can be a homopolymer, random, block, or graft copolymer. Useful rubbery polymers can be made from reactive monomers which can be part of the polymer chains or branched, or subsequently attached to the pre-formed polymer. Such rubbery polymers include butadiene polymers, butadiene/styrene copolymers, isoprene, chloroprene, butadiene or isoprene copolymers which have been hydrogenated, acrylonitrile/butadiene copolymers, isobutylene, isobutylene/butadiene copolymers, ethylene/propylene copolymers, ethylene/propylene/diene copolymers. Useful rubbery polymers are disclosed in U.S. Pat. Nos. 4,315,086 and 4,174,358, both hereby incorporated by reference insofar as they pertain to the selection of rubbery polymers.

The preferred rubber in the context of the preferred embodiments of the present invention includes a copolymer of ethylene and an α-olefin other than ethylene. The ethylene and α-olefin is preferably a copolymer of ethylene and an α-olefin selected from at least one $C_3$–$C_8$, preferably $C_3$–$C_6$ α-olefin. Propylene is a preferred monomer selected as the $C_3$–$C_8$ α-olefin in the copolymer. Other $C_3$–$C_6$ α-olefins, such as 1-butene, 1-pentene, and 1-hexene can be used in place of or in addition to propylene in the copolymers.

A useful backbone polymer of ethylene and an α-olefin contains from about 20 to 60 and preferably about 25 to 45 weight percent of the α-olefin based on the ethylene. The backbone copolymer preferably has a number average molecular weight of about from about 2,000 to 100,000, preferably about 2,000 to 65,000, more preferably about 5,000 to 35,000, and most preferably about 5,000 to 20,000. With respect to Mooney viscosity, typically values ranges from about 13 to about 55.

The grafting agents of the present invention have the formula:

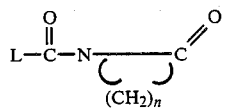

wherein L is a linking moiety that is capable of a thermal or radical-initiated addition reaction with said polymer. L is preferably

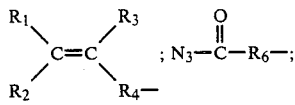

or $N_3SO_2$—$R_6$—; wherein $R_1$, $R_2$ and $R_3$ are the same or different and comprise at least one of the following moieties: Hydrogen, alkyl, aryl, halo, cyano, carboxylic acid, ester, amide, imide, and acyllactam, and wherein $R_4$ is—or

with $R_5$ being hydrogen, alkyl, or aryl; and $R_6$ is an alkylene or arylene group; and wherein the acyllactam portion of the grafting agent has an alkylene chain length, n, of about 2 to 11 carbon atoms, preferably about 3 to 11 carbon atoms, most preferably about 5 to 11 carbon atoms.

It is preferred that $R_5$ be hydrogen, alkyl of about 1 to 2 carbon atoms, or phenyl, particularly hydrogen or methyl. It is also preferred that $R_6$ be an alkylene or arylene, particularly at alkylene of about 1 to 4 carbon atoms or phenylene. However, it is particularly preferred that $R_6$ be an alkylene of about 1 to 3 carbon atoms.

In the preferred embodiments of this invention, it is preferred that L be:

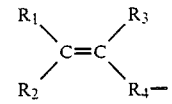

Wherein $R_1$, $R_2$ and $R_3$ are the same or different and are at least one moiety selected from the group consisting of H, ester, amide, alkyl of about ($C_1$–$C_8$), phenyl, and acyllactam, and $R_4$ is a simple bond, —. It is preferable that when $R_1$, $R_2$, and $R_3$ comprise at least one alkyl moiety, said moiety contain about 1 to about 4 carbon atoms, more preferably about 1 to about 2 carbon atoms.

In particularly preferred embodiments, $R_3$ is H or methyl and $R_1$ and $R_2$ are the same or different and are moieties selected from the group consisting of hydrogen, alkyl, aryl, esters, amides, or acyllactams, the most preferred being the acyllactams, particularly fumaryllactam or maleiyllactam. Illustrative of the preferred grafting agents within the context of the invention are methacrylylcaprolactam, acrylylcaprolactam, methacrylyllaurolactam, acrylyllaurolactam, fumarylcaprolactam, fumaryllaurolactam, cinnamylcaprolactam, cinnamyllaurolactam, and the like.

The present inventors do not wish to be bound by theory, however, they have found that the acyllactam grafting agents of the invention are effective as graft linking agents due to their high reactivity. In the preferred embodiments, this is by way of an addition reaction through the linking moiety, L, either by an unsaturation or through nitrene intermediates. The acyllactam functionality thus becomes attached to the polymer it is desired to modify, especially the preferred polymer backbones.

The modified polymers as described above are particularly suited for blending with second thermoplastic polymers. Useful second polymers for blending with the modified polymers are functionalized in that they have reactive groups that will react with the graft linking moiety of the reaction product. In the preferred embodiments, wherein the reaction product comprises a polymer backbone modified with grafting agent, useful second polymers have reactive nucleophilic groups, attached as a branch or end group. Functional groups include amino, imino, hydroxyl, and the like, with amino, and hydroxyl groups most preferred. Of these preferred second polymers may be mentioned polyamides, polyesters, amine-functionalized polyolefins, hydroxyl-functionalized polyolefins, amine-terminated polyethers, hydroxyl-terminated polyesters, amine or hydroxy terminated polysulfones, polyetherketones, polyimides or polycarbonates.

Polyamides suitable for use herein include the long chain polymer amides having recurring amide groups as part of the polymer backbone and preferably having a number average molecular weight, as measured by end group titration of about 15,000 to 40,000. The polyamides suitable for use herein can be produced by any conventional process known in the art.

Non-limiting examples of such polyamides are: (a) those prepared by the polymerization of lactams, preferably epsilon-caprolactam (nylon 6) or laurolactam (nylon 12); (b) those prepared by the condensation of a diamine with a dibasic acid, preferably the condensation of hexamethylenediamine with adipic acid (nylon 6,6) and the condensation of hexamethylenediamine with sebacic acid (nylon 6,10), the condensation of tetramethylenediamine with adipic acid (nylon 4,6), and the condensation of meta-xylylenediamine with adipic acid and/or terephthalic/isophthalic acid and/or epsiloncaprolactam; and those prepared by self-condensation of amino acids, preferably self-condensation of 11-aminoundecanoic acid (nylon-11); or random, block, or graft interpolymers consisting of two or more of these polyamides. Preferred are those obtained by the polymerization of epsilon-caprolactam.

Polyamides such as nylon-6 or nylon 6,6 can contain a variety of terminal functionality, including: (a) a carboxyl group attached to both ends of the polyamide chain; (b) an amino group attached to both ends of the polyamide chain; (c) a carboxyl group attached to one end and an amine group attached to the other end of the polyamide chain and mixtures thereof.

For the purposes of the present invention, amine terminated polyamide is preferred, and considered to be a polyamide comprising molecules having a preponderance of amino end groups. Polyamides having "excess" amine termination are particularly preferred, and are polyamides having molecules with more than 50 mole percent and preferably 60 to 97 mole percent end groups as amino end groups. Amine end group termination is typically produced by including an excess of diamines during polymerization. A preferred diamine in this case is hexamethylenediamine.

Other examples of diamines suitable for use herein include tetramethylenediamine, pentamethylene diamine, octamethylenediamine, decamethylenediamine, xylylenediamine, and dodecyldiamine. The amount of diamine needed to produce the excess amino terminated polyamides of the present invention varies depending on the amount of amine desired and the molecule weight of the resulting polymer and can be easily determined by one skilled in the art. For example, about 0.25 mole percent of hexamethylenediamine is required to produce a poly-epsiloncaprolactam of about 21,000 number average molecular weight having about 80 equivalents/$10^6$ g amino end group and about 17 equivalents/$10^6$ g acid end groups.

Polyesters useful for blending with the modified polymers of the invention include linear, saturated polyesters of aromatic dicarboxylic acids. The preferred linear saturated polyesters include poly(ethylene terephthalate), poly(butylene terephthalate), and poly(1,4-cyclohexane dimethylene terephthalate), with poly(ethylene terephthalate) being most preferred. The poly(ethylene terephthalate) for use with the present invention has an intrinsic viscosity range between about 0.4 and about 1.20, with a preferred intrinsic viscosity range between about 0.6 and 0.7. Intrinsic viscosity is obtained by extrapolation of viscosity values to zero concentration of solutions of poly(ethylene terephthalate) in 60 to 40 weight/volume ratio of phenol and tetrachloroethane. The measurements are normalized to 25° C. The poly(ethylene terephthalate) melts between about 250° C. and 275° C. The poly(ethylene terephthalate) can contain minor amounts, up to 5%, of other comonomers such as 1,4 cyclohexanedimethanol, butylenediol, neopentylendiol, diethylene glycol, or glutaric acid.

Preferred second polymers for purposes of the present invention include polyamides, polyesters, and polyolefins having reactive groups selected from carboxyl, hydroxyl, anhydride, and amines. More preferred polymers are polyethylene terephthalate, polybutylene terephthalate, polyepsiloncaprolactam, polyhexamethylene adipamide, polytetramethylene adipamide, aromatic polyamides, polyesters elastomers, thermoplastic polyether-ester elastomers, ethylenic ionomer resins, and the like.

The blends of the invention may also contain one or more conventional additives such as stabilizers and inhibitors of oxidative, thermal, and ultraviolet light degradation, lubricants and mold release agents, colorants, including dyes and pigments, flame-retardants, fibrous and particulate fillers and reinforcements, plasticizers, and the like. These additives are commonly added during the mixing step.

Representative oxidative and thermal stabilizers which may be present in blends of the present invention include Group I metal halides, e.g., sodium, potassium, lithium with cuprous halides, e.g., chloride, bromide, iodide; hindered phenols, hydroquinones, and varieties of substituted members of those groups and combinations thereof.

Representative ultraviolet light stabilizers, include various substituted resorcinols, salicylates, benzotriazoles, benzophenones, and the like.

Representative lubricants and mold release agents include stearic acid, stearyl alcohol, and stear-amides. Representative organic dyes include nigrosine, while representative pigments, include titanium dioxide, cadmium sulfide, cadmium selenide, phthalocyanines, ultramarine blue, carbon black, and the like. Representative fillers include carbon fibers, glass fibers, amorphous silica, asbestos, calcium silicate, aluminum silicate, magnesium carbonate, kaolin, chalk, powdered quartz, mica, feldspar, and the like.

Representative flame-retardants include organic halogenated compounds such as decabromodiphenyl ether and the like.

Representative plasticizers include lactams such as caprolactam and laurolactam, sulfonamides such as o,p-toluenesulfonamide and N-ethyl, o,p-toluenesulfonamide and other plasticizers known in the art.

In the method of the present invention, a reaction product is formed by contacting a first polymer with the grafting agent, using conventional techniques such as heating in a solvent medium, melt-blending, and the like. Particularly preferred are melt-blending techniques such as high shear mixing in a Farrell continuous mixer, mixing in a rubbery state, and extruder processing. The present inventors have discovered that modification of the first polymer with the grafting agent of the invention takes place within the time frame of an extrusion. Thus, the grafting techniques as described herein are particularly suitable for extruder processing and the like.

In the preferred embodiments, a polymer backbone as described herein is first reacted with the grafting agent. If conventional melt-blending techniques are utilized, it is preferable that they be performed in a closed mixing device, such as an extruder, for a time sufficient to allow a reaction to occur between the grafting agent and the polymer backbone to allow attachment of at least some of the grafting agent as pendant moieties along the polymer backbone. Temperatures that may be utilized vary according to the properties of the components employed, but are typically above the melting temperature of the polymer components, but below temperatures that lead to degradation of the components. Typical temperatures range from about 150° C. to about 300° C., particularly preferred, however, are temperatures of about 180° C. to about 270° C.

In the preferred embodiments wherein a polymer backbone is modified with grafting agent, the amount of grafting agent useful to functionalize the polymer backbone may vary widely depending on the particular polymer and grafting agent utilized as well as the desired characteristics of the resulting reaction product. One of skill in the art will understand that in the context of forming blended compositions, above above 50% polymer backbone, a phase inversion occurs so that the backbone becomes the continuous phase with particles of the second polymer dispersed therein. The properties of such a blend are then primarily due to the backbone, and the product is no longer a high modulus molding compound. However, below about 5% polymer backbone, there is insufficient polymer backbone for high impact resistance. Thus, in the particularly preferred embodiments, there is a relatively small amount of polymer backbone with a relatively large amount of second polymer sidechain. It is preferred that there be less than about 50% by weight of the total composition of polymer backbone, and more preferred that there be less than about 30% by total weight, especially about 5% to about 25%, and 15% to 25%. In this context then, preferred amounts of grafting agent range from about 0.25% to about 8.0% by weight of the rubber component, preferably about 1.0% to 5.0%, most preferably about 1.5% to 3.0%. However, it should be understood that if a modified polymer backbone (modified rubber) is desired, in lieu of a molding composition, the preferred ratio of polymer components could be reversed, and preferred amounts of grafting agent might tend to increase to even higher than an 8% level.

It is preferred in some embodiments of the method of the present invention, that the polymer be melt-blended with the grafting agent using conditions which are severe enough for a satisfactory reaction to occur without the necessity of adding a free radical catalyst. Reaction of the polymer with the acyllactam need not be quantitative. For example, in the case of modifying a polymer backbone, it is necessary only that the average number of acyllactams per polymer chain in the backbone are sufficient for reaction with nucleophilic moieties in the second polymer, to enhance the blending of the polymers.

However, the reaction product can also be formed using the polymer backbone and the grafting agent as recited above in the presence of a free radical catalyst, employing conventional amounts of the catalyst. Useful free radical catalysts include peroxides such as dialkyl, diaryl, and diacyl peroxides. Other useful free radical catalysts include N-bromoimides, dialkylazos and the like.

The reaction product of the first polymer and grafting agent itself is useful as a structural resin, and does not have to be blended with a second polymer. However, it also demonstrates adhesive properties useful in laminations to other polymers, coextrusions with other polymers, metal bonding, and the like, and could be used in applications such as these. The reaction product is a stable product that may be stored for further use. Alternatively, it may be desirable for some applications to blend all the components, a first polymer, grafting agent, and a second thermoplastic polymer, either together or sequentially.

In the preferred embodiments of the method of the present invention, a polymer backbone/second thermoplastic polymer blended composition is formed. This is achieved by blending the second polymer as described herein with the polymer backbone, grafting agent, and any other desired additional components. The components may be added to one another at the same time, or added to one another in any combination or in any sequential fashion of individual or combined components. However, in the most preferred embodiments, the polymer backbone/grafting agent reaction is first carried out, and the resulting modified backbone polymer is then combined with the second polymer component to form the polymer backbone/second thermoplastic polymer blend.

Thermoplastic compositions of the invention can demonstrate improved toughness and delamination resistance. It should thus be appreciated that they can be made into a wide range of useful articles by conventional molding methods employed in the fabrication of thermoplastic articles, i.e., as molded parts, extruded shapes, e.g., tubing, films, sheets, fibers and oriented fibers, laminates and wire coating. "Molding" means forming an article by deforming the blend in the heated plastic state.

The preferred compositions of this invention are characterized by an outstanding combination of properties, foremost of which is outstanding toughness properties in view of the quantity of functionalized backbone polymer present with the second polymer, such as a polyamide. The unusually high toughness provides greater ductility, less sensitivity to scratches and molded-in notches, and vastly reduced susceptibility to catastrophic failure when compared with previously known compositions in molded parts. Injection molded parts often are of varying thicknesses and may have scratches, molded-in notches of varying radii, and molded in stresses. In addition, orientation effects may cause varied ductility throughout a molded part. The maintenance of high uniform values of notches Izod toughness throughout such molded parts characterizes the improved compositions resistance to brittle breaks. The compositions are of sufficient toughness that the effect of minor changes in processing conditions will not cause significant variations in toughness from lot to lot quantities of composition.

EXAMPLES

Example I

A mixture of 19.79 parts of ethylene-propylene rubber (Exxon's Vistalon MD 730, 47% ethylene, 53% propylene, Mooney viscosity=17), 0.2 parts of N-methacrylylcaprolactam and 0.01 parts of dicumyl peroxide was extruded on a corotating, twin-screw extruder (Leistritz 30/34) having an L/D ratio of 40/1, at a screw speed of 140 rpm and throughput of 21 lbs/hr with the following temperature profiles: Zone 1=230° C., Zone 2=250° C., Zone 3=260° C., Zone 4=270° C., Zone 5=260° C., Zone 6=250° C., Zone 7=250° C., Zone 8=230° C., Zone 9=250° C., Zone 10=250° C. A mixture of 70 parts of nylon 6, with balanced end groups (formic acid viscosity=70, [amine]=49 meq g$^{-1}$; [carboxyl]=49 meq g$^{-1}$) and 10 parts of amine terminated nylon 6 (formic acid viscosity=58; [amine]=72 meq g$^{-1}$ and [carboxyl]=22 meq g$^{-1}$) was charged into the downstream feed port (at Zone 4) of the above twin-screw extruder. Thus, the EP rubber was pregrafted with methacrylylcaprolactam between Zones 1-4 and then melt blended/reacted with nylon 6 between Zone 5-10, to achieve the desired graft copolymer blend in a one-pass operation. The blend extrudate was cooled and pelletized. The pellets were dried in a vacuum overn at 110° C. for 24 hrs. The dried pellets of impact modified nylon were injection molded on an Arburg injection molding machine with a barrel temperature of 230° C., nozzle temperature of 220° C., and injection pressure of 600 psi. The notched Izod of a 3/16″ bar was 14.3 ft.lbs/in.

COMPARATIVE EXAMPLE

A mixture of 20 parts EP rubber and 0.02% dicumyl peroxide was extruded in the extruder described in Example 1 using the same nylon mixture and the same conditions and procedure. The notched Izod of these bars was 2.9. This demonstrated the need for a grafting agent, and the effectiveness of methacrylylcaprolactam.

EXAMPLES 2-6

Using the same nylon, rubber, apparatus, conditions and procedures, the following trials were carried out as expressed in the following table:

TABLE I

| Example Number | Grafting Agent | % charged based on rubber |
|---|---|---|
| 2 | methacrylylcaprolactam | 2 |
| 3 | methacrylylcaprolactam (200 rpm screw speed) | 2 |
| 4 | acrylylcaprolactam | 2 |
| 5 | acrylylcaprolactam (all amine-terminated nylon 6) | 2 |
| 6 | methacrylyllaurolactam | 2.5 |

| Example Number | % Dicup based on Rubber | Notched Izod (ft lbs/in) | Tensile Strength at yield (psi) | Flex Modulus (psi) |
|---|---|---|---|---|
| 2 | 0.2 | 13.8 | 8800 | 266,000 |
| 3 | 0.2 | 13.5 | 8700 | 279,000 |
| 4 | 0.2 | 14.0 | 8200 | 260,000 |
| 5 | 0.2 | 10.4 | 8400 | 270,000 |
| 6 | 0.2 | 14.1 | 8000 | 258,000 |

EXAMPLES 7-9

In Examples 7, 8, and 9, 80 parts of polyamide were melt blended with 20 parts of EP rubber containing 2 parts methacrylylcaprolactam and 0.2 parts dicumylperoxide:

TABLE II

| Example Number | Nylon Type | Notched Izod ft. lbs (in) | Tensile Strength at Yield (psi) | Flex Modulus |
|---|---|---|---|---|
| 7 | 6,6 (Zytel ® 101) | 3.6 | 8000 | 269,500 |
| 8 | 60 parts 4,6 17.5 parts 6, with balanced ends 2.5 parts 6, with amine end groups | 3.9 | 7800 | 255,900 |
| 9 | 4,6 (from DSM) | 3.4 | 8200 | 248,200 |

The procedure was the same as for Example 1, but because of the higher melting points of nylon 6,6 and 4,6, the temperature profiles in the extruder were higher beyond zone 5. For Examples 7, 8, 9, zone 1=250°, zone 2=250°, zone 3=250°, zone 4=250°, zone 5=200°. For Example 7, zone 6=250°, zone 7=260°, zone 8=265°, zone 9=265°, zone 10=265°. For Examples 8 and 9, zone 6=265°, zone 7=300°, zone 8=300°, zone 9=300°, and zone 10=300°.

EXAMPLES 10-11

Acyllactam grafting agents are also effective with backbones other than EP rubber. A block copolymer of styrene-ethylene-butylene-styrene (Kraton G1657 from Shell Chemical Co.), 100 parts, was tumble blended with 2 parts of methacrylylcaprolactam and 0.2 parts of dicumylperoxide. This mixture was extruded on a Killion extruder of 1 inch diameter, 30/1 L/D ratio.

The temperatures were: zone 1=163°, zone 2=205°, zone 3=219°, zone 4=232°, Die 1=177°, Die 2=163°.

The treated rubber was pelletized and dried at 50° C. for 16 hours in a vacuum oven. The treated rubber, 20 parts, was tumble blended with 80 parts of the nylon 6 described in example 1, then extruded in the Killion extruder. Temperature profile was: zone 1=218°, zone 2=244°, zone 3=260°, zone 4=260°, Die 1=260°, Die 2=227°.

TABLE III

| Example Number | Kraton G1657 | Izod (ft. lbs/in) | Flex Modulus (psi) |
|---|---|---|---|
| 10 | untreated | 2.0 | 263.900 |
| 11 | treated wih methacrylylcaprolactam | 3.2 | 329.700 |

EXAMPLES 12-13

Acyllactam grafting agents are also effective with second polymers other than polyamides, resulting in a composition wherein the second polymer is attached as a side chain to a polymer backbone. Mixture of 19.56 parts of ethylene-propylene rubber (Exxon's Vistalon MD 719, 75% ethylene, 25% propylene, Mooney viscosity=54), 0.4 parts of N-methacrylyllaurolactam and 0.04 parts of dicumyl peroxide was extruded on the Leistritz extruder described in Example 1. Throughput was 20 lbs/hr and temperature profile was as follows:
Zone 1=220° C., Zone 2=250° C., Zone 3=250° C., Zone 4=210° C., Zone 5=255° C., Zone 6=255° C., Zone 7=255° C., Zone 8=255° C., Zone 9=255° C., Zone 10=255° C.

Polyethylene terephthalate; 80 parts was charged into the downstream feed port at Zone 4. The polyester had an intrinsic viscosity of 0.7 as determined in phenol/tetrachloroethane, 60/40 by weight, at a concentration of 0.5 gram/deciliter, and a carboxyl end group concentration of 0.03 milliequivalents/gram.

Pellets of the extrudate were dried in a vacuum oven at 110° C. for 16 hrs. The dried pellets were injection molded on an Arburg machine with a barrel temperature of 240° C., nozzle temperature of 240° C. and injection pressure of 600 psi. The notched Izod of a ¼ in bar was 2.4 ft lbs/in of notch. Another sample, prepared in the same way, but without the acyllactam grafting agent, had an Izod of 1.4.

What is claimed:
1. A reaction product consisting essentially of (a) a polymer selected from the group consisting of polyamides, polyesters, and a copolymer consisting essentially of ethylene and an alpha-olefin other than ethylene and (b) an acyllactam grafting agent having the formula:

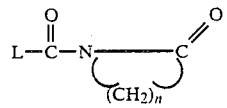

wherein L is a linking moiety that is capable of a thermal or radical-initiated addition reaction with said polymer; and wherein the acyllactam portion has an alkyl chain length, n, of about 2 to 11 carbon atoms.

2. The reaction product of claim 1 wherein L has the formula selected from the group consisting of:

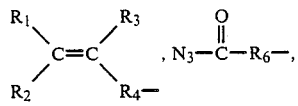

or $N_3SO_2-R_6-$, wherein $R_1$, $R_2$ and $R_3$ are the same or different and comprise at least one of the following moieties: Hydrogen, alkyl, aryl, halo, cyano, carboxylic acid, ester amide, imide, acyllactam; and wherein $R_4$ is valence bond or

with $R_5$ being hydrogen, alkyl, or aryl; and wherein $R_6$ is an alkylene or arylene moiety.

3. The reaction product of claim 2 wherein n is about 3 to 11 carbon atoms.

4. The reaction product of claim 3 wherein n is about 5 to 11 carbon atoms.

5. The reaction product of claim 2 wherein L has the formula:

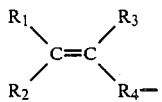

wherein $R_1$, $R_2$ and $R_3$ are the same or different and are at least one moiety selected from the group consisting of H, ester, amide, alkyl, aryl, and acyllactam, and $R_4$ is valence bond or

wherein $R_5$ is hydrogen, alkyl, or aryl.

6. The reaction product of claim 3 wherein said acyllactam grafting agent is selected from the group consisting of methacrylylcaprolactam, acrylylcaprolactam, methacrylyllaurolactam, acrylyllaurolactam, fumarylcaprolactam, fumaryllaurolactam, cinnamylcaprolactam, and cinnamyllaurolactam.

7. The reaction product of claim 4 wherein said acyllactam grafting agent is methacrylylcaprolactam.

8. The reaction product of claim 4 wherein said acyllactam grafting agent is methacrylyllaurolactam.

9. The reaction product of claim 1 wherein said α-olefin in said copolymer is selected from at least one $C_3-C_8$ α-olefin.

10. The reaction product of claim 9 wherein said α-olefin is propylene.

11. The reaction product of claim 10 wherein said α-olefin is present in a range of about 20% to about 45% percent by weight based on the ethylene.

12. The reaction product of claim 10 wherein said graft linking agent is selected from the group consisting of methacrylylcaprolactam, methacrylyllaurolactam, acrylylcaprolactam, acrylyllaurolactam, fumarylcaprolactam, fumaryllaurolactam, cinnamylcaprolactam, and cinnamyllaurolactam.

13. A reaction product consisting essentially of ethylene-propylene rubber and an acyllactam grafting agent having the formula:

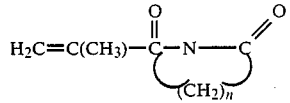

wherein the acyllactam portion has an alkyl chain length, n, of about 2 to 11 carbon atoms.

14. The reaction product of claim 13 wherein n is about 3 to about 11 carbon atoms.

15. The reaction product of claim 14 wherein n is about 5 to about 11 carbon atoms.

16. The reaction product of claim 15 wherein said acryllactam is methacrylylcaprolactam.

17. The reaction product of claim 15 wherein said acyllactam is methacrylyllaurolactam.

* * * * *